Feb. 23, 1971   G. E. GOODE   3,564,718

LOGIC PLOTTER

Filed March 25, 1969   3 Sheets-Sheet 1

INVENTOR
GEORGE E. GOODE

Hanz, Glaser, & Harwood

ATTORNEYS

United States Patent Office

3,564,718
Patented Feb. 23, 1971

3,564,718
LOGIC PLOTTER
George E. Goode, 1222 Chippewa Drive,
Richardson, Tex. 75080
Filed Mar. 25, 1969, Ser. No. 810,131
Int. Cl. G06g 1/00
U.S. Cl. 33—1      7 Claims

ABSTRACT OF THE DISCLOSURE

Disclosed is a method and graphic plotting apparatus for designing and analyzing logic circuits. A template overlay having a plurality of precisely located apertures, an enlarged window, and a number of standard logic symbol cutouts is disposed over a worksheet having a plurality of Karnaugh maps thereon. The registration of the template apertures and/or enlarged window with the correspondingly located minterms of the Karnaugh maps is used in the design and analysis of logic circuitry.

---

This invention pertains to graphic plotters, and more particularly to graphic plotting apparatus used in the design and analysis of logic networks.

The rapid growth of the digital computer industry over the last decade is a direct result of the realization that complex accounting, scientific, industrial process control, and data transmission functions, for example, can be quickly and efficiently performed utilizing automated digital techniques. As a consequence, the ability to quickly and accurately analyze and design logic networks to perform the desired functions has become imperative for the modern circuit designer.

The normal procedure involved in the design of a logic network, particularly one involving sequential logic circuit memory elements (flip flops) ordinarily involves the initial definition or determination of the desired condition of certain variables (output, input, and/or internal equilibrium state) of the network; next, the derivation of appropriate memory element input and total circuit output functions, for example, for each of the flip flops of the network; and finally the selection and interconnection of the appropriate combinational logic elements (NOR gates, NAND gates, etc.) to provide these desired input and output functions. The derivation of the memory element input functions, in particular has, prior to this invention, been a tedious task for the logic circuit designer.

It is therefore a primary object of the invention to provide a method and apparatus for a logic circuit designer to facilitate the design and analysis of logic networks.

It is another object of the invention to provide an improved method and apparatus for the manual design and analysis of logic networks.

It is a further object of the invention to provide graphic plotting apparatus for the logic circuit designer which serves as an accurate and efficient tool for the design and analysis of synchronous sequential logic circuits.

These and other objects of the invention are provided by a design technique whereby the collective condition of at least one variable type associated with a logic network is initially represented by a coded and/or vector designation of the operation of that network, and thereafter transferred or fractured into component parts for deriving the appropriate circuit functions. The analysis technique then involves the reverse of this procedure. For the purpose of the description herein, a variable type is defined as an input signal (s), output signal (s), or memory element (s).

More specifically, graphic plotting apparatus is provided comprising a worksheet, upon which are located a first and second set of logic minimization maps, for example Karnaugh maps. Each of the cells or minterms of both the first and second sets of Karnaugh maps represents or contains a coded designation of the condition of at least onet type variable associated with a logic network or element of that logic network. The designations contained or represented by the minterms of one of the Karnaugh map sets are then utilized to lay out of plot the designations contained or represented by the minterms of the other Karnaugh map set, depending upon whether design or analysis is involved. In some examples, arrows or vectors between minterms are utilized to depict the next state of the particular type variable.

A template overlies the worksheet and is at least transparent at the locations over each of the Karnaugh maps. Apertures are defined in the template and are so spaced so as to be in registry with and disposed over correspondingly located minterms of each the Karnaugh maps. Cutouts in the shape of various standard logic symbols are also provided in the template, as well as an enlarged rectangular window or cutout which overlies one of the first set Karnaugh maps on the worksheet.

More specific details of the invention, as well as other objects and advantages thereof, are embodied in the following description, taken in conjunction with the drawings wherein.

Figure 1:
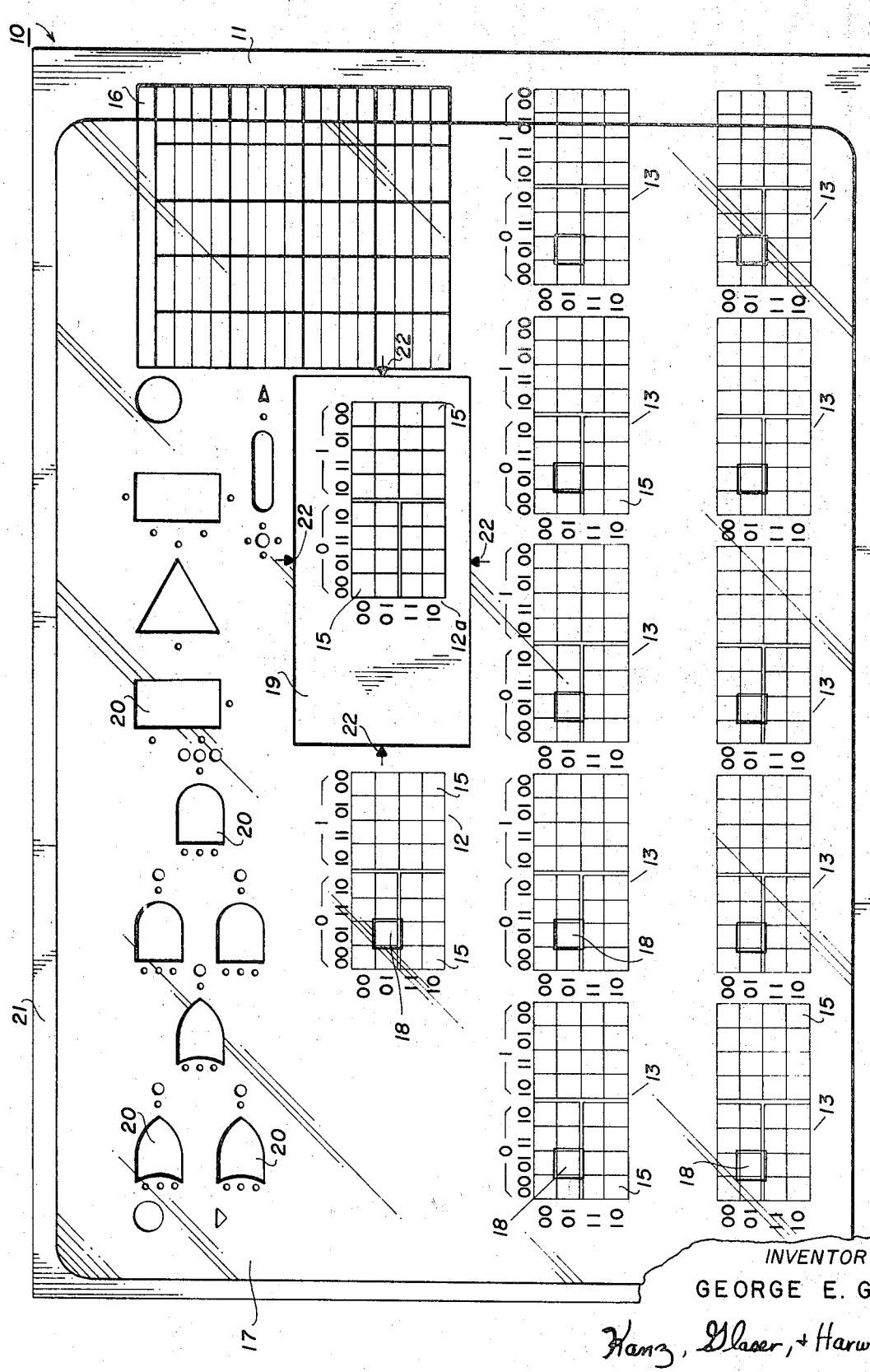
FIG. 1 is a plan view of the combination of the worksheet and overlay template of the invention.

Referring now to FIG. 1, graphic plotting apparatus 10 includes a worksheet 11 which may be formed of plastic, paper, or any other suitable material. Disposed by printing, for example, upon a top face of the worksheet 11 are a first and second set of maps, generally known in the art as Karnaugh maps.

The first set includes a pair of Karnaugh maps, designated generally by the reference numerals 12 and 12a. The second set includes a plurality of Karnaugh maps designated generally by the referenc numeral 13. As will be subsequently described, the left map 12 of the first set is employed in conjunction with one or more maps 13 of the second set when one is designing a logic network; the right map 12a of the first set is employed in conjunction with one or more maps 13 of the second set when one is analyzing a logic network.

Each of the Karnaugh maps of both sets comprises a plurality of adjacently located cells 15, commonly referred to as minterms. Because of the numerical labeling along the periphery of the map (00, 01, 11, etc.) each of these minterms can be uniquely identified by its coordinate location on this map.

For example, the minterm located at the most upper-left hand corner can be designated by the coordinates 00000, while the minterm located at the most upper-right hand corner can be designated by the coordinates 00100. The size of each of the Karnaugh maps (number of minterms) is determined by the number of variables to be plotted. For example, assuming that each variable has two states (0 and 1), the maps illustrated in FIG. 1 are adapted ot plot up to five variables.

Map 12 or 12a, depending upon whether a design or analysis procedure is being carried out, may be utilized to plot the collective conditions of at least one type variable (as that term has hereinbefore defined) of an entire logic network composed of interconnected logic elements. For purposes of definition, the term logic element herein refers either to a logic gate, such as an AND, OR, NAND or NOR gate, for example; or to a binary memory element, such as a J-K or R-S flip flop, for example, each of these logic elements being interconnected to form the overall logic network.

In addition to the first and second sets of Karnaugh maps, a table 16 can be employed to summarize the collective conditions of the variable or variables being plotted, and a blank space 21 on the worksheet 11 can be utilized to sketch the logic network being designed or analyzed.

Disposed over the worksheet 11 is an overlay or template 17 having a plurality of apertures or cell locator windows 18, which respectively expose select minterms of each of the Karnaugh maps. In accordance with a specific feature of the invention, each of the windows 18 are so located on the overlay 17 so as to be in registry with and exposed only correspondingly located minterms of each of the Karnaugh maps of the first and second set. For example, as illustrated in FIG. 1, the windows 18 are disposed so as to expose only the minterm designated by the coordinate 01001 of each of the Karnaugh maps 12 and 13. In this manner the logic designer's attention is focused only upon this particular cell at this time.

The overlay sheet 17 may be of any suitable material, for example plastic, with the requirement that the portion which overlies the Karnaugh map 12 be transparent so that the map 12 may be observed therethrough. In addition, a large rectangular aperture or window 19 completely exposes the map 12a for the purpose hereinafter defined. A plurality of arrows 22 imprinted adjacent the edges of the window 19 also directs the user's attention to the specific minterm 01001, as illustrated in FIG. 1.

The template 17 also includes a series of cutouts 20 in the shape of standard logic symbols to enable the designer to trace out the desired logic network on the blank space 21 of the worksheet 11.

Figure 2:
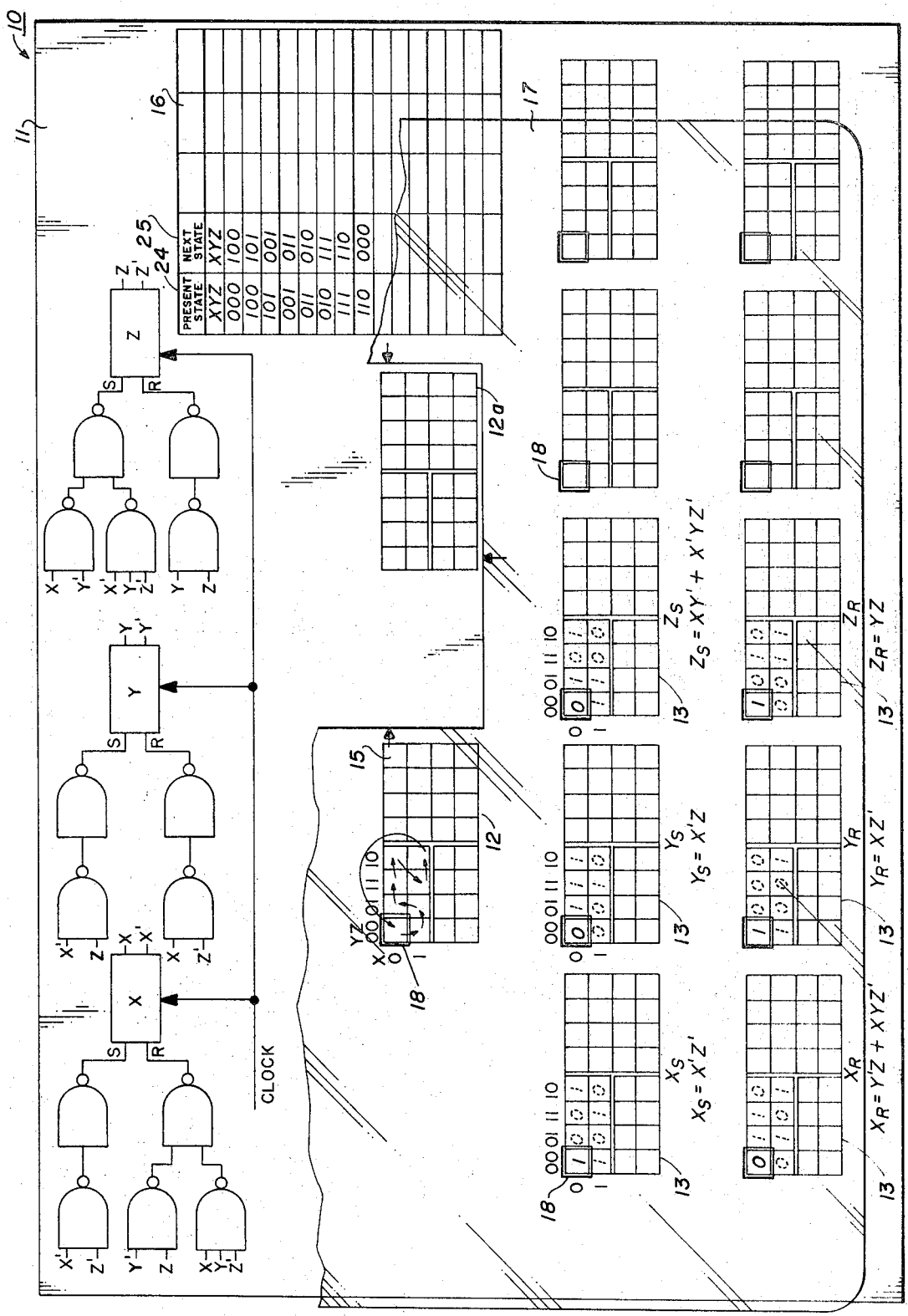
FIG. 2 is an illustrative example of one use of the apparatus of the invention in the design of a counter.

Referring now to FIG. 2, there is described one example of the use of the plotter apparatus 10 of the invention in the design of an arbitrary modulus 8 counter using three R–S flip flops X, Y, and Z and NAND logic gates at the respective R and S inputs. A simultaneous clock input to the memory elements or flip flops X, Y, and Z enables all flip flops to change state at substantially the same time.

There is initially summarized in conventional binary notation (0 and 1) in the columns 24 and 25 of the table 16, the collective present and next condition or state, respectively, of the variable being plotted, in this example the internal states of the flip flops X, Y, and Z. Accordingly, the flip flops X, Y, and Z go from an initial 000 state to 100, then to 101, 001, 011 etc. This is actually a collective representation of the condition of each of the flip flops internal state at a given point in time. Thus the present state 101, for example, indicates that X flip flop is in the "1" state; Y flip flop, the "0" state; and Z, the "1" state.

The state summary of table 16 is next transferred or mapped on the Karnaugh map 12. Since there are three flip flops, each having two internal states, the total number of required minterms 15 will be $2^3=8$; consequently only the upper-left hand quadrant of the map 12 will be employed in this example, and the appropriate coordinates are labeled X, Y and Z accordingly. The analysis map 12a is not used in this example.

The mapping of the Karnaugh map 12 is accomplished by drawing arrows or vectors, in the manner illustrated in FIG. 2, from one minterm to the other to graphically represent the information summarized in table 16. Thus, for example, it is seen that an arrow or vector begins in minterm or cell 000 (representing $X=0, Y=0, Z=0$) and ends in cell 100 meaning that the counter moves from state 000 to state 100 upon receiving a clock pulse. Similarly, from present state 100 the counter goes to next state 101 upon receiving the next clock pulse. Transitions from the remaining counter states are likewise plotted on the map 12. It is therefore evident that the map 12 serves as a "transition" map and provides in one map all information from the table 16 and "next state" maps frequently used to solve sequential problems. Thus, the table 16 is not essential to obtaining solutions for the problems.

The input functions to each of the flip flops X, Y, and Z are now derived utilizing the plotter apparatus of the invention. Accordingly, each of the Karnaugh maps 13 are appropriately labeled $X_s$, $Y_s$ and $Z_s$ representing the input functions at the set input for each of the flip flops; and $X_r$, $Y_r$ and $Z_r$ representing the input functions at the reset input for each of the flip flops. Each of the maps 13 is now utilized for representing the respective next-state condition of the internal variable summarized on transition map 12 for each flip flop.

One begins by placing the template 17 over the worksheet so that the cell locator window 18 initially overlies the minterm 000 of the transition map 12. This registry correspondingly exposes the similarly located minterms on the next-state maps 13 within the remaining cell locator windows 18. With the overlay 17 thus positioned to expose cell 000, the user clearly sees, due to the transparent quality of the overlay at the transition map location, that the next state of the counter is 100, meaning that the next conditions of the internal state variables are to be $X=1, Y=0$, and $Z=0$. This then requires that a "1" be placed in the exposed windows of the $X_s$, $Y_r$ and $Z_r$ maps, and that a "0" be placed in the exposed windows of the $X_r$, $Y_s$ and $Z_s$ maps.

All of the remaining minterms or cells are plotted in the same fashion until all "0's" and "1's" have been chartered on the next state maps 13. The order of plotting is of no consequence, but to insure that a cell is not missed, a systematic means of plotting each cell should be employed; for example, by moving to the right on the first row of cells, then beginning with the left cell on the second row, etc. until all cells are plotted. In this manner all the "0's" and "1's" have been indicated (by dotted outline). As the final steps, the "no-change" don't care cells are determined from the maps 13, the resultant maps then factored to provide the required input functions shown for each flip flop. These final steps are accomplished in a conventional manner known in the art, and do not require a detailed description.

The advantages of the plotting apparatus 10 is now readily observed. The plotter and the cell locator windows 18 insure that the representation of a "0" or "1" is inserted only in the correct cells or maps 13, while not obstructing the view of the worksheet 11 or the data located thereupon. Thus the worksheet and template combination enables the designer to obtain a solution in a compact format. As described, the plotting of all "next state" maps 13 in parallel, as controlled by the plotter apparatus 10, results in a substantial amount of time being saved, and insures greater accuracy in deriving the required functions.

The graphic plotting apparatus of the present invention may also be used for the analysis of logic networks. The procedure involved in such analysis is actually the inverse of that just described for the design procedure.

Figure 3:
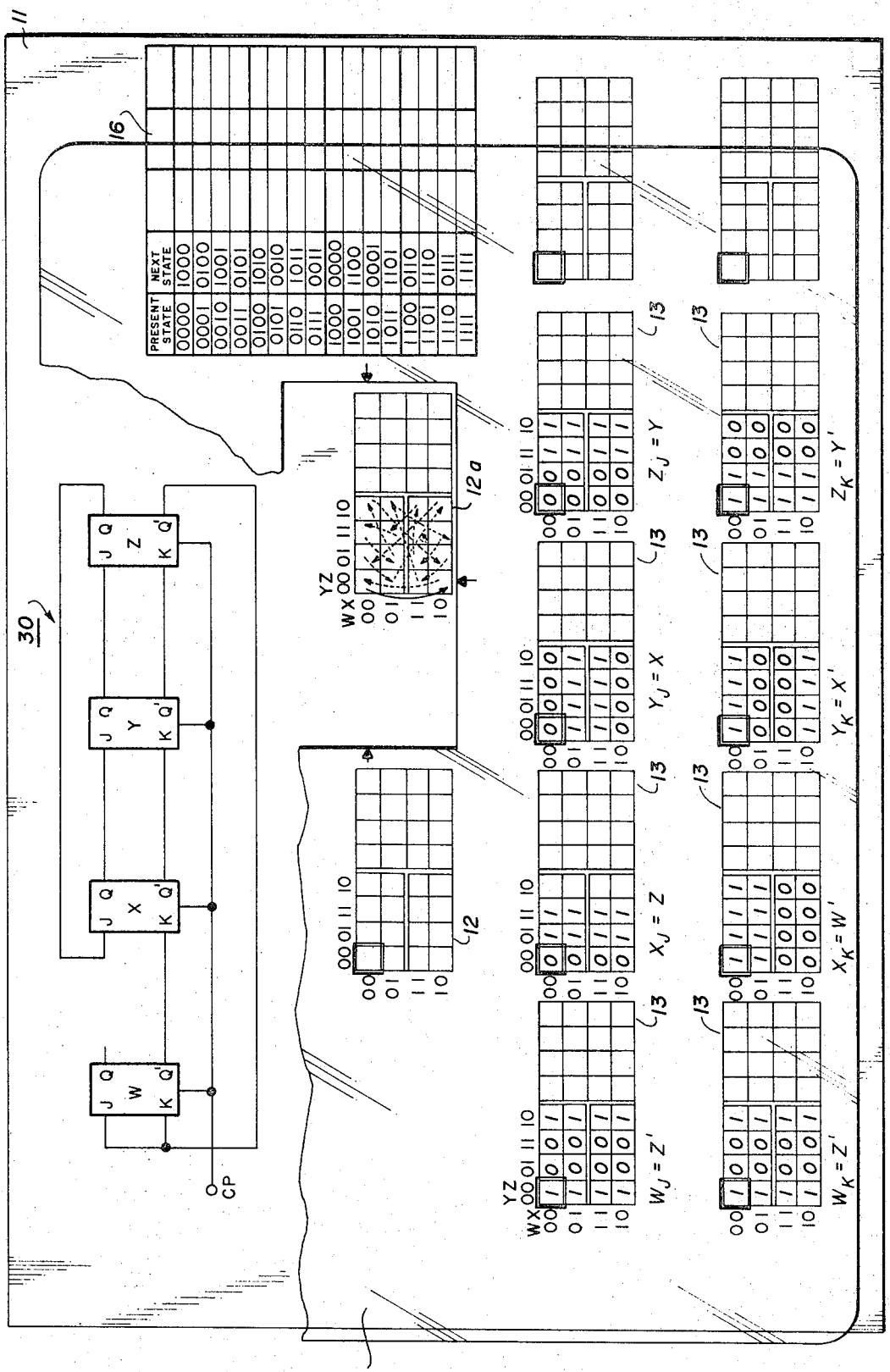
FIG. 3 is an illustrative example of one use of the apparatus of the invention in the analysis of a counter network.

Accordingly, reference is to FIG. 3 where a counter 30 displayed on the worksheet 11 is interconnected in a prescribed manner and includes J–K flip flops, W, X, Y, and Z. The input functions or equations are given under the particular Karnaugh maps 13 for each of the flip flops, and the respective minterms are appropriately labeled with the "0" or "1" in accordance with these input equations. As observed, each of the J–K flip flops have a pair of Karnaugh maps ($W_J$ and $W_K$; $X_J$ and $X_K$; $Y_J$ and $Y_K$) representing the input functions for the J and K inputs. In this example, the map 12 will not be employed, but the map 12a of the said first set will be used in conjunction with the next internal state Karnaugh maps 13.

The analysis procedure is begun by positioning the template 17 over the worksheet 11 to align the cell locator windows 18 on the all zero cell (upper-left most cell), for example, of each of the maps 13. When the cell locator windows 18 are aligned on the all zero cells, the arrowheads 22 focus attention on the identical cell on the map 12a, and the enlarged window 19 enables the following described vector plotting to be accomplished without lifting the template 17 from the worksheet.

Looking through these cell locator windows 18, the logic inputs to each of the flip flops W, X, Y and Z are found to be

| | | | |
|---|---|---|---|
| $W_J=1$ | $X_J=0$ | $Y_J=0$ | $Z_J=0$ |
| $W_K=1$ | $X_K=1$ | $Y_K=1$ | $Z_K=1$ |

From the above inputs and knowledge of J–K flip flop operation, the next state for the all zero present internal state is $W=1$; $X=0$; $X=0$; $Y=0$. Keeping the template 17 in the same position therefore, a transistion arrow is drawn from the 0000 cell present internal state cell to the 1000 present internal state cell, as observed by solid vector line in FIG. 3.

In similar manner, the remaining vectors may be plotted on the map 12a (as indicated by dotted lines), and thereafter be summarized in the table 16. Inspecting the transition map 12a for the counter 30 reveals that it has four cycle periods (10, 3, 2, and 1), the period depending upon its present state. It could be used as a decade counter although it would not have the synchronous self-starting property since it would hang-up in a 1-point (all-ones state), 2-point or 3-point cycle. Additional logic is needed to force it back on to the 10-point cycle should it ever get off. With the requirement specified, the template can again be used as a design aid with the same worksheet to derive and design the modified logic.

The graphic plotter apparatus of the present invention may be employed in the design and analysis of numerous types of logic networks. While only two examples have been illustrated herein, many more examples have been illustrated in the article entitled "Novel Approach to Sequential Design," authored by George E. Goode in the December 1968 issue of EDN Magazine. In addition, the method disclosed herein may be the subject of a computer program, the design and analysis thereby being performed by conventional data processing or computer equipment.

Various modifications may be made to the above described embodiments by one ordinarily skilled in the art without departing from the spirit and scope of the invention as defined by the appended claims.

What is claimed is:
1. Graphic plotting apparatus, comprising:
   (a) a worksheet having disposed upon a front face thereof a plurality of logic minimization maps, each having a plurality of adjacently located minterms,
   (b) an overlay member for disposition over said front face, said overlay member being transparent at the locations over each of said logic minimization maps, and having a plurality of apertures therein so spaced to be in registry with and disposed over correspondingly located minterms of each map.

2. The graphic plotting apparatus described in claim 1 wherein said logic minimization maps comprises a first and second set of Karnaugh maps, each of the minterms of said Karnaugh maps adapted to represent or contain a coded designation of the condition of a variable associated with a logic network.

3. The graphic plotting apparatus as described in claim 2 wherein said overlay member includes an enlarged opening in registry with one of the Karnaugh maps of the first set, and arrows adjacent the edges of said enlarged opening direct ones attention to the said correspondingly located minterm of the said one Karnaugh map of the said first set.

4. The graphic plotting apparatus as described in claim 3 wherein said overlay member includes cutouts in the shape of various logic symbols.

5. A method for designing logic networks comprising:
   (a) plotting the collecitve condition of at least one variable type associated with a logic network of a first set logic minimization map on a worksheet having disposed upon a front face thereof a plurality of logic minimization maps, each having a plurality of adjacently located minterms,
   (b) placing an overlay member over said front face, said overlay member being transparent at the locations over each of said logic minimization maps and having a plurality of apertures therein so spaced to be in registry with and disposed over correspondingly located minterms of each map, and
   (c) plotting the condition of a variable type on a second set of logic minimization maps as dictated by the information contained on the said first set of logic minimization maps through said apertures in said overlay member.

6. The method as described in claim 5 wherein said first mentioned plotting comprises designating by code within each of the minterms of said logic minimization maps the operation of the said logic network.

7. The method as described in claim 6 wherein said first mentioned plotting comprises designating by vectors between each of the minterms of said logic minimization maps the operation of said logic network.

References Cited
UNITED STATES PATENTS 2,304,327  12/1942  Anderson _____ 33—1.5

FOREIGN PATENTS 677,477  6/1939  Germany _____ 33—1.5

LEONARD FORMAN, Primary Examiner

GARY G. KUEHL, Assistant Examiner